July 12, 1960 R. D. RUMSEY 2,944,559
LINEAR POSITIONING SERVO MECHANISM
Filed Sept. 4, 1957
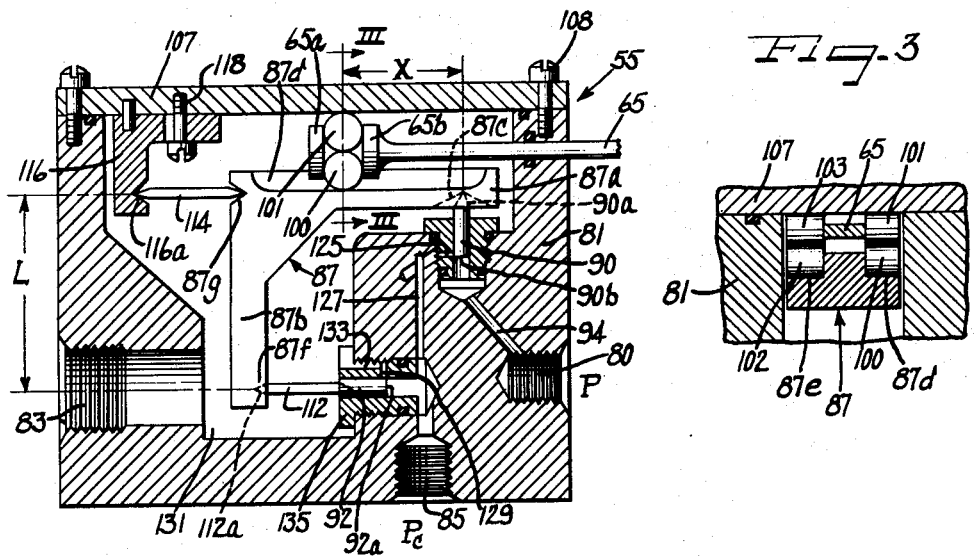
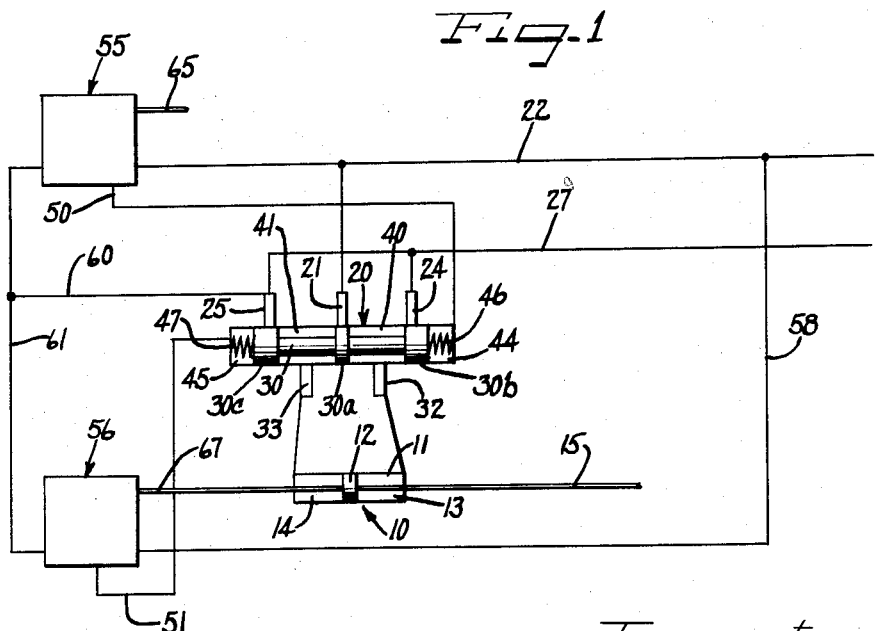
Inventor
Rollin Douglas Rumsey
by Hill, Sherman, Meroni, Gross & Simpson Attys United States Patent Office 2,944,559
Patented July 12, 1960

2,944,559

LINEAR POSITIONING SERVO MECHANISM

Rollin Douglas Rumsey, Buffalo, N.Y., assignor to Houdaille Industries, Inc., Buffalo, N.Y., a corporation of Michigan Filed Sept. 4, 1957, Ser. No. 682,032

4 Claims. (Cl. 137—85)

This invention relates to a fluid operated control system and particularly to a hydraulically operated system in which the output from two linear hydraulic potentiometers is fed to a spool valve in order to control positioning of a power output actuator.

It is an object of the present invention to provide a novel fluid operated control system.

A further object of the invention is to provide a servo control system which is fluid pressure operated and capable of providing a linear input-output characteristic.

Another object of the invention is to provide a novel mechanism for generating a control pressure varying as a predetermined function of a mechanical input.

Still another object is to provide a hydraulically operated servo control system which is of relatively simple construction and which is rugged and reliable in use.

Other and further important objects, features and advantages of the present invention will be apparent from the following detail description taken in connection with the accompanying drawings, in which:

Figure 1 is a somewhat diagrammatic illustration of a fluid operated control system in accordance with the present invention;

Figure 2 is a sectional view illustrating a hydraulic potentiometer for utilization in the system of Figure 1; and Figure 3 is a fragmentary sectional view taken generally along the line III—III of Figure 2.

The present invention is particularly adapted to the control of actuation of a power output device such as a piston and cylinder assembly generally indicated by reference numeral 10 in Figure 1 and comprising a cylinder 11 having a piston 12 dividing the cylinder into working chambers 13 and 14 and operative to drive an output shaft 15 connected with the piston 12 in accordance with the differential in pressure between working chambers 13 and 14.

By way of preferred example, the supply of fluid under pressure to the respective working chambers 13 and 14 may be under the control of a spool valve assembly 20 having an inlet pressure port 21 connected to a high pressure line 22 and relief pressure ports 24 and 25 connected with a low pressure line 27. A spool valve body 30 controls communication between the inlet port 21 and the respective output ports 32 and 33 connected respectively with the working chambers 13 and 14. It will be observed that the spool valve body 30 may include a central annular spool portion 30a of sufficient axial extent to entirely close off communication between the inlet port 21 and the interior chambers 40 and 41 of valve assembly 20. Similarly, in the neutral position of the valve body 30 illustrated, end spool portions 30b and 30c close off the relief ports 24 and 25 so as to lock the piston 12 against movement.

The spool valve assembly further includes biasing chambers 44 and 45 having springs 46 and 47 therein which are preferably of identical construction so as to normally maintain the spool body 30 in its central position. These springs may be pre-loaded to any desired extent depending on the desired characteristics of the valve. A control pressure is adapted to be supplied to the biasing chamber 44 by means of a hydraulic line indicated at 50, while a second control pressure is supplied to biasing chamber 45 by means of a hydraulic line 51. These control pressures are supplied by an input fluid actuated mechanism 55 and a follow-up fluid actuated mechanism 56. High pressure line 22 is illustrated as being directly connected with the mechanism 55 and connected with the mechanism 56 by means of a branch hydraulic line 58. Return line 27 connects with the mechanisms 55 and 56 by means of lines 60 and 61.

The mechanism 55 is adapted to have an input control shaft 65 providing an input mechanical displacement which is converted by the mechanism 55 into a correspondingly varying control pressure at the line 50. Preferably in accordance with the illustrated embodiment, the control pressure at line 50 is a linear function of the input mechanical displacement. The follow-up mechanism 56 has an input control shaft 67 connected with the piston 12 in the illustrated embodiment to assume a position reflecting the condition of the output device 10. The control pressure in the line 51 of the mechanism 56, which may be identical to the mechanism 55, may thus be a linear function of the actual position of the piston 12. Thus, when the follow-up shaft 67 is in exact correspondence with the input shaft 65, the control pressure at lines 50 and 51 will be identical, and the pressures in biasing chambers 44 and 45 will then also be substantially identical to maintain the spool valve body 30 in the neutral position illustrated. If the input control shaft 65 is then moved in a direction to increase the control pressure at line 50 (e.g. to the left), the resulting increase in pressure in biasing chamber 44 over that in biasing chamber 45 will cause the spool body 30 to shift to the left affording communication between inlet port 21 and outlet port 32 through interior valve chamber 40 to produce an increased pressure in working chamber 13, while port 33 will be connected through interior valve chamber 41 with relief port 25 to relieve pressure from working chamber 14. Under these circumstances, the piston 12 will be displaced to the left moving the follow-up shaft 67 to the left to increase the control pressure at line 51 until such time as the control pressure in biasing chamber 45 equals the control pressure in biasing chamber 44 and the spool valve 30 is restored to its neutral position.

If the input control rod 65 is moved in such a direction as to decrease the control pressure in line 50 (to the right), the pressure in biasing chamber 44 will be reduced relative to the pressure in biasing chamber 45 and spool valve body 30 will move to the right supplying high pressure to the working chamber 14 and thus moving follow-up control rod 67 to the right to decrease the control pressure in line 51 until balance is restored.

The control mechanisms 55 and 56 may be identical, and the mechanism 55 has been illustrated in Figure 2 by way of example. It will be observed that the high pressure line 22 connects with a supply pressure port 80 in the housing 81 of the mechanism while return line 61 connects with a return pressure port 83. A control pressure port 85 of the mechanism connects with the line 50 in Figure 1. For controlling the pressure in the control pressure port 85 in a linear manner, an angle shaped lever 87 is provided having a first leg 87a acted upon by an input pressure piston 90 and a second leg 87b acting upon a control pressure piston 92. Input pressure is supplied at one end of the input piston 90 by means of a passage 94 communicating with the supply pressure port 80. The opposite end of the input piston 90 may have a conical face 90a acting in a conical recess 87c of the lever. The control rod 65 controls the position of rollers 100–103 seen in Figures 2 and 3, the rollers 100 and 102 riding in recesses 87d and 87e of the lever 87 and the rollers 101 and 103 riding on the undersurface of a cover plate 107 secured to the housing part 81 by means of screws such as indicated at 108. It will be observed that the piston 90 acts on the lever 87 at a fixed position therealong while the control rod 65 confines the rollers 100–103 for longitudinal movement therewith by means of shoulders 65a and 65b. The force exerted by the input piston 90 in conjunction with the reaction force exerted by means of the rollers 100–103 provides a couple exerting a counterclockwise moment on the lever 87. The torque exerted by this couple is infinitely adjustable by means of the control rod 65, the length of the leverage arm between the piston 90 and the rollers 100–103 being designated by the variable X in Figure 2.

Opposing this turning moment is a clockwise moment exerted by means of the control pressure piston 92 through the medium of a pin 112 which is seated in the piston 92 at one end and has a conical face 112a seated in a conical recess 87f of the lever 87. A knife edge 114 is provided at a distance L from the pin 112 and bears against the lever 87 at a recess 87g and is supported by means of a groove 116a in an angle bracket 116 secured to the cover plate 107 by means of screws such as 118.

Assuming equal areas for the ends 90b and 92a of pistons 90 and 92, at equilibrium of the lever 87 it will be apparent that control pressure $P_c$ at port 85 will be equal to supply pressure P divided by the distance L indicated in Figure 2 times the variable distance X illustrated in Figure 2; thus, $$P_c = \frac{PX}{L}$$

The control pressure $P_c$ is thus a linear function of the input mechanical displacement X.

The lever 87 is maintained in an equilibrium position in spite of fluctuations in supply pressure by means of a valve port 125 cooperating with the end 90b of piston 90 whereby if the supply pressure becomes excessive, port 125 will be opened to bleed supply pressure by means of passage 127 to the control pressure port 85 correspondingly increasing control pressure to provide a counteracting force against the control pressure piston 92 to offset any increase in supply pressure. Similarly, if control pressure should tend to become excessive, piston 92 will be moved to the left to expose a port 129 which communicates with the relief port 83 through the central chamber 131 of the housing by means of a slot 133 in bushing 135. In the illustrated embodiment, the positive mechanical connection between pistons 90 and 92 by means of lever 87 and pin 112 prevents ports 125 and 129 from both being open at the same time, and both ports 125 and 129 will tend to remain in closed position as shown in Figure 2.

It will be understood that control mechanism 55 is operative to provide a linear proportionality between input displacement X and output control pressure $P_c$ over the range from X=0 to X=L, with the control pressure $P_c$ being variable from zero at X=0 to equality with the supply pressure P at X=L. Hence, the operation exactly duplicates the output of an electrical potentiometer having a linear characteristic. The operation of follow-up mechanism 56 is identical to that just described for control mechanism 55 except that the control rod corresponding to the control rod 65 in Figure 2 is connected to the piston 12, as indicated at 67 in Figure 1.

*Summary of operation*

With the system in equilibrium as illustrated in Figures 1 and 2, if the input control rod 65 is moved to the right, as seen in Figure 2, to decrease the input displacement variable X, the control pressure $P_c$ will be correspondingly reduced, causing an unbalance between biasing chambers 44 and 45 so that spool valve body 30 is moved to the right, supplying pressure to the working chamber 14 of the output device 10. This causes piston 12 to move to the right and correspondingly moves the follow-up shaft 67 of follow-up mechanism 56 to the right, whereupon the control pressure in line 51 in Figure 1 is reduced until the spool valve body 30 returns to its neutral position locking the piston 12 in the new position corresponding to the new input displacement X.

If the control rod 65 is moved to the left increasing the input displacement X, the control pressure $P_c$ at control pressure port 85 and in line 50 increases, increasing the pressure in biasing chamber 44 and moving spool valve 30 to the left. This causes the supply of fluid under pressure to working chamber 13 to produce movement of piston 12 and follow-up shaft 67 to the left until the control pressure at line 51 and in biasing chamber 45 equalizes with the control pressure in biasing chamber 44 to return the spool valve body 30 to the neutral position shown.

The lever 87 is maintained in its equilibrium position illustrated since if it tends to rotate in the counterclockwise direction, the end 90b of input piston 90 will expose valve port 125 bleeding pressure through passage 127 to exert an increasing force on the end 92a of control pressure piston 92. On the other hand, if the lever 87 tends to rotate in the clockwise direction, port 129 will be uncovered by the end 92a of control pressure piston 92 to bleed fluid from the control pressure system, thereby reducing the control pressure and counteracting the tendency of the lever to move in the clockwise direction.

It will be apparent that many modifications and variations may be effected without departing from the scope of the novel concepts of the present invention.

I claim as my invention:

1. A fluid control system comprising a fluid operated output device having a pair of working chambers for receiving fluid under pressure to actuate said device in respective opposite directions, valve means displaceable in respective opposite directions to supply fluid under pressure to the respective working chambers and having biasing fluid chambers for receiving fluid under pressure to bias said valve means in respective opposite directions, first fluid pressure means for providing an output control pressure linearly proportional to an input signal and connected with a first one of said biasing chambers to provide a biasing force on said valve means linearly proportional to said input signal and tending to move said valve means in a first direction to cause said output device to be actuated in a corresponding first direction, and second fluid pressure means for providing an output control pressure which is a linear function of and is in response to an input variable and operatively connected with said output device to cause said control pressure to increase as said output device moves in said first direction and to decrease as said output device moves in the opposite direction, whereby said output device will be actuated in accordance with said input signal to said first fluid pressure means, said first and second fluid pressure means comprising a housing having an interior space, lever means disposed in said space and having sufficient clearance to allow limited angular displacement, first torque applying means for applying a torque to said lever means tending to rotate the lever means in a first direction and comprising input fluid pressure transmitting means acting at a first position along said lever means and input signal transmitting means for acting on said lever means in an opposite sense from said input fluid pressure transmitting means and at a variable distance from said first position dependent upon an input signal, second torque applying means for applying a torque to said lever means tending to rotate the lever means in the opposite direction from said first torque applying means and comprising control fluid pressure transmitting means, means defining input and control pressure chambers communicating respectively with said input and control fluid pressure transmitting means, means of delivering an input fluid pressure to said input pressure chamber for controlling the force exerted by said input fluid pressure transmitting means on said lever, input control means for controlling the position of said input signal transmitting means along said lever means in accordance with said input signal, means comprising said control fluid pressure transmitting means for maintaining a control pressure in said control pressure chamber proportional to the position of said input signal transmitting means, said control pressure chamber of each of said first and second fluid pressure means being connected with said first and second biasing chambers respectively, and said input control means of said second fluid pressure means being connected with said pressure actuated device for actuation thereby.

2. A fluid actuated mechanism comprising a housing having an interior space, lever means disposed in said space and having sufficient clearance to allow limited angular displacement, first torque applying means for applying a torque to said lever means tending to rotate the lever in a first direction and comprising input fluid pressure transmitting means acting at a first fixed position along said lever means and input signal transmitting means for acting on said lever means in an opposite sense from said input fluid pressure transmitting means and at a variable distance along the lever means from said first position dependent upon an input signal, second torque applying means for applying a torque to said lever means at a second fixed position tending to rotate the lever means in the opposite direction from said first torque applying means and comprising control fluid pressure transmitting means, means defining input and control pressure chambers communicating respectively with said input and control fluid pressure transmitting means, means for delivering an input fluid pressure to said input pressure chamber for controlling the force exerted by said input fluid pressure transmitting means on said lever means, input control means for controlling the position of said input signal transmitting means along said lever means in accordance with said input signal, and means comprising said control fluid pressure transmitting means for maintaining a control pressure in said control pressure chamber linearly proportional to the position of said input signal transmitting means.

3. A fluid pressure actuated device comprising a housing having an internal space, a lever disposed in said space, means for exerting respective opposite turning moments on said lever including a first couple and a second couple, said first couple comprising an input piston acting on said lever at a fixed point and referenced to an input pressure and an input signal means for acting on said lever at a variable position therealong, said second couple comprising a control piston acting upon the lever at a second fixed point and effective to oppose the moment of the first piston, and means comprising said control piston for establishing a control pressure varying linearly in accordance with the position of said input signal means relative to said input piston.

4. A fluid actuated device comprising a housing having an internal space, an L-shaped lever in said space having first and second angularly related leg portions, a first couple for acting on said first leg portion at a first fixed point and tending to rotate said L-shaped member in one direction and comprising an input piston referenced to input pressure and input control means acting on said first leg portion at an adjustable distance along said first leg portion from said input piston, a second couple acting on said second leg portion at a second fixed point and tending to rotate said L-shaped lever in the opposite direction and comprising a control piston, means defining a control chamber communicating with said control piston and having a pressure therein which is a linear function of displacement of the input control means, means defining an input chamber communicating with said input piston, means for connecting said input chamber with said control chamber upon movement of said input piston beyond a predetermined position in a sense tending to rotate said lever in said one direction, and means for reducing pressure in said control chamber upon movement of said control piston beyond a predetermined position in a sense tending to rotate said lever in said opposite direction, and means comprising said control piston for maintaining a control pressure in said control chamber corresponding linearly to the position of said input means along said first leg portion.

References Cited in the file of this patent

UNITED STATES PATENTS

| | | |
|---|---|---|
| 1,718,673 | Wettstein | June 25, 1929 |
| 2,503,397 | Le Valley | Apr. 11, 1950 |
| 2,637,334 | Starkey | May 5, 1953 |
| 2,638,874 | Woodhull | May 19, 1953 |
| 2,739,573 | Hammer | Mar. 27, 1956 |
| 2,860,650 | Schink | Nov. 18, 1958 |